March 14, 1961     W. L. DAVIS, JR     2,975,000
APPARATUS FOR TRANSFERRING FLUIDIZED SOLIDS
Filed Nov. 12, 1959
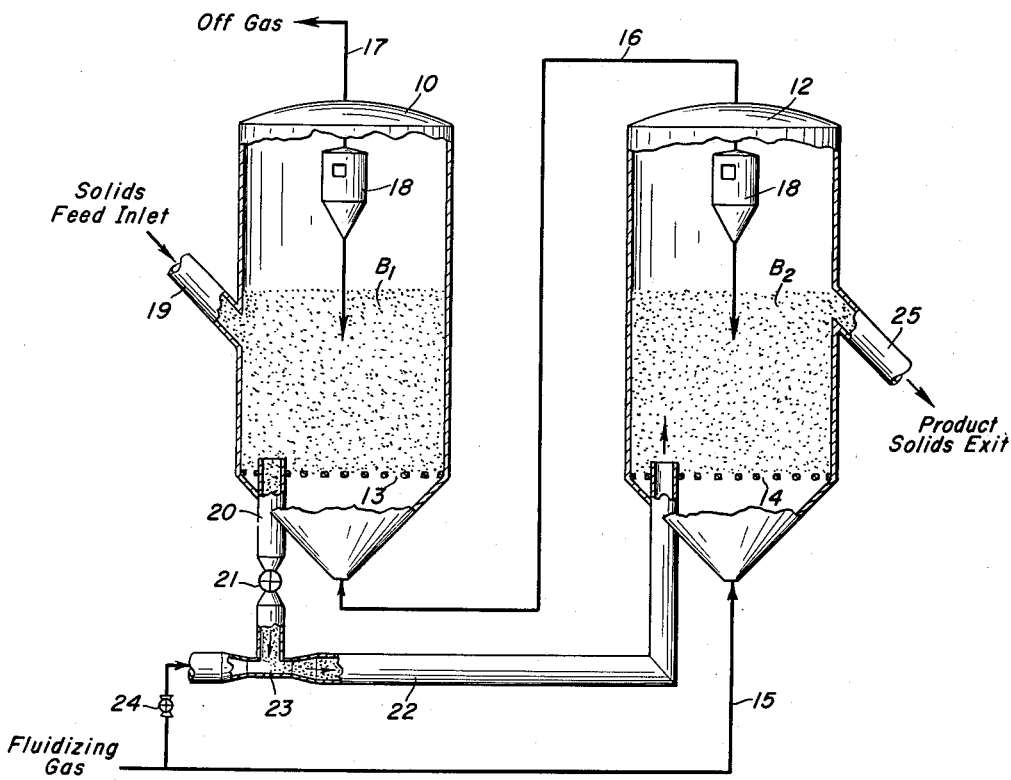
INVENTOR
WILLIAM L. DAVIS Jr.
By Donald G. Dalton
Attorney

United States Patent Office

2,975,000
Patented Mar. 14, 1961

2,975,000

APPARATUS FOR TRANSFERRING FLUIDIZED SOLIDS

William L. Davis, Jr., Monroeville, Pa., assignor to United States Steel Corporation, a corporation of New Jersey Filed Nov. 12, 1959, Ser. No. 852,513

1 Claim. (Cl. 302—17)

This invention relates to an improved apparatus for transferring fluidized solids between vessels.

The invention is particularly applicable to a system in which fluidized solids and a fluidizing gas flow counter to each other through two or more vessels in series, for example in certain plural-step continuous direct reduction processes for iron ore. Since a bed of fluidized solids offers resistance to flow of gas, pressure of a fluidizing gas decreases as the gas flows through each bed. Thus in a system of this type solids pass from a vessel in which pressure is lower to another in which pressure is higher. As far as I am aware, it has always been thought necessary to locate the lower pressure vessel physically above the higher pressure vessel to achieve sufficient head to overcome the pressure gradient and thus enable solids to flow by gravity from the former to the latter. This arrangement unduly increases the height of an installation and thus adds to equipment and construction costs, as well as operating costs, since it is also necessary to elevate all solids to a height greater than the top vessel. Nevertheless the invention is not limited to systems in which the gas flows in series, but has general application where fluidized solids are transferred against a pressure gradient.

An object of the present invention is to provide an improved fluidized solids transfer apparatus which overcomes the need to locate vessels one above the other, thus decreasing the height of such installations.

A further object is to provide an improved apparatus which transfers fluidized solids between vessels without regard to the pressure or height relation of the vessels, thus enabling solids to pass from a lower pressure vessel to a higher pressure vessel at the same elevation.

A more specific object is to provide an improved transfer apparatus which embodies a venturi throat for controlling movement of a solids-gas stream to enable the solids to move from a lower pressure vessel to a higher pressure without regard to the relative heights.

In accomplishing these and other objects of the invention, I have provided improved details of structure, a preferred form of which is shown in the accompanying drawing, in which:

The single figure is a somewhat diagrammatic vertical sectional view of a fluidized solids system which embodies a transfer apparatus in accordance with my invention.

The drawing shows a fluidized solids installation which comprises first and second vessels 10 and 12 located side-by-side at approximately the same elevation. The first vessel 10 contains a perforate horizontal partition 13, which supports a bed $B_1$ of finely divided solids. Similarly the second vessel 12 contains a perforate horizontal partition 14 which supports a bed $B_2$. Fluidizing gas enters the bottom of vessel 12 through an inlet line 15 and passes upwardly through bed $B_2$ to maintain the bed in a fluidized state. A line 16 carries off-gas from the upper portion of vessel 12 to the bottom of vessel 10, where it passes upwardly through bed $B_1$ to maintain this bed also in a fluidized state. An outlet line 17 carries off-gas from the upper portion of vessel 10. The gas outlet lines from each vessel are shown equipped with conventional dust collectors 18, which remove entrained particles from the off-gas and return such particles to the respective beds. The gas pressure in vessel 10 is of course lower than that in vessel 12. Since the vessels per se are of conventional construction, they are shown only diagrammatically.

Finely divided solids feed continuously to vessel 10 through a conventional feeder 19 and leave through a standpipe 20. The drawing shows an adjustable valve 21 in the standpipe for controlling the discharge rate, although other equivalent means could be substituted, such as an overflow type of discharge. In accordance with my invention, the standpipe leads to a pneumatic conveyor pipe 22, which is connected at one end to the gas inlet line 15 and extends into the other vessel 12. The cross-sectional area of the conveyor pipe is reduced to form a venturi throat 23 in the region where the standpipe joins it. Ahead of the venturi throat, the conveyor pipe contains an adjustable valve 24 for regulating the volume of gas which flows through this pipe. Vessel 12 is equipped with a conventional solids discharge 25.

In operation, a regulated portion of the inlet gas destined for vessel 12 passes through the conveyor pipe 22. Within the venturi throat 23 velocity of this gas increases and its pressure decreases in accordance with the well known principles of fluid dynamics. Pressure at the venturi throat becomes less than pressure in vessel 10, whereby solids flow from bed $B_1$, through the standpipe 20 into the conveyor pipe 22. There is no pressure gradient to cause gas from pipe 22 to flow through the standpipe into vessel 10. Instead this gas continues on into vessel 12 and carries solids from pipe 20 into the latter vessel.

In the example of iron ore reduction, the inlet gas introduced via line 15 is a reducing gas, such as hydrogen, preheated to a suitable reaction temperature, commonly about 1400 F. Solids introduced to vessel 10 are iron ore fines preheated to a suitable reaction temperature, commonly about 1600 F. The solids discharging from vessel 10 are a partially reduced product, for example approaching FeO in composition of about 30 percent reduced. The solids discharging from vessel 12 are a more completely reduced product, for example approaching metallic iron in composition or about 90 percent reduced. Off-gas from vessel 12 has lost its capacity for reducing FeO to metallic iron because a substantial portion of the hydrogen has been converted to water vapor, but retains capacity for reducing higher oxides of iron to FeO. Off-gas from vessel 10 is regenerated for re-use in the process by scrubbing out water vapor, and the remaining gas is combined with fresh reducing gas to make up for the reducing constituents consumed or otherwise lost.

From the foregoing description it is seen that my invention affords a simple apparatus which enables fluidized solids to be transferred from a lower pressure vessel to a high pressure vessel at the same elevation. Thus it is not necessary to locate one vessel above the other. It is apparent that the invention also is useful in installations which do not utilize a series flow of gases, as long as the pressure relation interferes with the desired solids flow. The invention also can be used in installations which include more than two vessels.

While I have shown and described only a single embodiment of my invention, it is apparent that modifications may arise. Therefore, I do not wish to be limited to the disclosure set forth but only by the scope of the appended claim.

I claim:

In an installation which includes at least two vessels located side-by-side and substantially at the same elevation and adapted to house beds of fluidized solids, a gas inlet pipe connected to one of said vessels for introducing a fluidizing gas, piping for carrying off-gas from this vessel to the other vessel where it acts as fluidizing gas but at lower pressure than in the first vessel, means for feeding solids to the lower pressure vessel, and means for discharging solids from the higher pressure vessel, the combination therewith of an apparatus for transferring solids from the lower pressure vessel to the higher pressure vessel, said apparatus comprising a standpipe connected to the lower pressure vessel through which solids discharge, a pneumatic conveyor pipe connected to said inlet and extending into the higher pressure vessel, a venturi throat in said conveyor pipe, said standpipe joining said conveyor pipe at said throat, and an adjustable valve in said conveyor pipe ahead of said throat for admitting a controlled portion of the gas from said inlet pipe into said conveyor pipe, whereby said throat decreases the pressure in said conveyor pipe to direct the gas and solids stream to the higher pressure vessel in preference to the lower pressure vessel.

References Cited in the file of this patent

UNITED STATES PATENTS

| | | |
|---|---|---|
| 1,454,979 | Muhlfeld | May 15, 1923 |
| 2,609,248 | Kleiber | Sept. 2, 1952 |
| 2,667,448 | Munday | Jan. 26, 1954 |